United States Patent [19]

Catté et al.

[11] 4,234,663

[45] Nov. 18, 1980

[54] THERMOPLASTIC MULTI-LAYER FOIL STRUCTURE

[75] Inventors: Raymond Catté, Cuqueron; Robert Laputte, Pau; Jean-Claude Moulies, Dagneux; Jean-Pierre Lalaün, Pau, all of France

[73] Assignee: ATO Chimie, Paris, France

[21] Appl. No.: 7,514

[22] Filed: Jan. 29, 1979

[30] Foreign Application Priority Data

Jan. 30, 1978 [FR] France .................. 78 02554

[51] Int. Cl.³ .................. B32B 27/08; B32B 5/16
[52] U.S. Cl. .................. 428/517; 156/94; 156/306.6; 156/334; 260/2.3; 264/37; 264/DIG. 69; 428/327; 428/518; 428/519; 428/520
[58] Field of Search ............. 428/327, 520, 35, 519, 428/518, 517; 264/DIG. 69, 37; 260/2.3; 156/309, 94

[56] References Cited

U.S. PATENT DOCUMENTS

| 3,026,229 | 3/1962 | Wilcox | 156/309 |
|---|---|---|---|
| 3,824,114 | 7/1974 | Vassiliades | 428/327 |
| 3,962,018 | 6/1976 | Costemalle | 156/334 |
| 3,977,153 | 8/1976 | Schrenk | 264/37 |
| 4,045,603 | 8/1977 | Smith | 264/DIG. 69 |
| 4,097,648 | 6/1978 | Pringle | 260/2.3 |
| 4,111,349 | 9/1978 | Buckler | 428/519 |
| 4,123,584 | 10/1978 | Brewton | 260/2.3 |

*Primary Examiner*—Ellis P. Robinson
*Attorney, Agent, or Firm*—Burgess, Ryan and Wayne

[57] ABSTRACT

A thermoplastic multi-layer foil structure comprises a styrenic polymer layer and an olefinic polymer layer bonded by an intermediary polymer layer comprising at least one layer constituted by a bonding agent. In this multi-layer structure, at least one layer containing scrap produced from said multi-layer foil structure is included in the latter, said scrap-containing layer including a mixture of said scrap with a convenient proportion of a graft copolymer of a styrenic monomer on a polyolefinic substrate.

18 Claims, No Drawings

THERMOPLASTIC MULTI-LAYER FOIL STRUCTURE

The present invention is related to a thermoplastic multi-layer foil structure comprising at least one styrenic polymer layer and at least one olefinic polymer layer bonded to each other by at least one intermediary layer of a polymer comprising at least one bonding layer constituted by a bonding agent. The invention is also directed to shaped articles, especially thermoformed articles (i.e. articles shaped under heat) made from such thermoplastic multi-layer structure.

The industrial applications of thermoplastic multi-layer foil structures have been developed on a considerable scale during the last years, especially in the field of heat-shaped, or thermo-formed, wrappings, as well as in the fields of manufacturing furniture, sanitary ware or installations. In these fields, numerous types of thermoplastic multi-layer foil structures are currently used, which involve the use either of only high-diffusion polymers or of the combination of a high-diffusion polymer with a polymeric substance having specific properties in view of the contemplated application.

Amongst the numerous known thermoplastic multi-layer foil structures, the multi-layer foil structures comprising a styrenic polymer layer, especially a polystyrene layer, associated to an olefinic polymer layer, especially a polyethylene or polypropylene layer, are quite advantageous in the field of manufacturing furniture or sanitary ware, as well as in the field of manufacturing rigid wrappings or container elements for certain food products such as fruit juice, margarine, cheese, etc. In such multi-layer foil structures the styrenic polymer layer provides for a satisfactory aptitude for deformation or shaping, especially for thermoforming (or shaping under heat), for rigidity of the final product after shaping, and for easy coloration and easy application of printed patterns onto such structure, while the olefinic polymer layer provides for satisfactory resistance to fatty substances, for imperviousness to steam or $H_2O$ vapor, and for satisfactory thermal resistance.

It is known that the olefinic polymers, i.e. polymers such as polyethylene, polypropylene, polybutene-1, poly(4-methylpentene), are incompatible with the styrenic polymers, especially polystyrene, polymethylstyrene, polychlorostyrene, styrene/acrylonitrile copolymers; thus with a view to producing multi-layer foil structures comprising an olefinic polymer layer associated to a styrenic polymer layer, and having the desired properties, particularly a high delamination resistance (i.e. a high resistance to the separation of the associated layers of the foil structure), it has been proposed inter alia to insert between said layers an intermediary layer made of a polymer and provided with at least one bonding layer formed of a convenient bonding agent which has satisfactory rheological and mechanical properties (especially good extrusion and cohesion properties) and which is compatible with the polymers constituting, respectively, the styrenic polymer layer and the olefinic polymer layer of the multi-layer foil structure.

Such multi-layer foil structures are produced by various well-known processes, such as the gluing process, the extrusion-lamination process and the so-called co-extrusion process; this latter process, which comprises extruding simultaneously a plurality of polymers so as to produce a composite multi-layer foil structure is particularly advantageous when the thus formed multi-layer foil structures are to be used for the manufacturing of thermoformed articles, since it is possible to perform the successive operations of co-extrusion and thermoforming in a continuous manner.

When multi-layer foil structures are used for manufacturing shaped articles, especially thermoformed articles, a considerable amount of scrap is obtained, in particular when the thermoforming process is carried out. Thus in the case of the continuous production of rigid wrappings or containers comprising co-extruding the multi-layer foil structure and consecutive thermoforming the containers from the co-extruded multi-layer foil structure, the scrap may represent as much as 40% or even 50% of the total weight of the initially coextruded material. It will thus be understood that it would be extremely advantageous, from an economical point of view, to re-introduce into the multi-layer foil structure at least part of the scrap of said structure, which occurs during the shaping or forming operations, especially during thermoforming, such re-introduction being carried out by disposing at least one layer of scrap within the intermediary layer of the multi-layer foil structure. The problem of the reinsertion of the scrap into the multi-layer foil structures has been the object of a great amount of research work; however, up to now no really satisfactory solution to this problem has been found, as regards the multi-layer foil structures comprising one styrenic polymer layer and one olefinic polymer layer bonded to each other by an intermediary layer of a polymer substance provided with at least one bonding agent layer.

One object of the present invention is to provide a multi-layer foil structure of the above-defined type wherein the problem of reinsertion into said structure of the scrap produced during the forming or shaping operations (especially thermoforming operations) of said structure can be resolved in a satisfactory manner.

In accordance with the present invention, the multi-layer foil structure comprising a styrenic polymer layer and an olefinic polymer layer bonded together by an intermediary layer comprising at least a bonding layer constituted by a bonding agent, further comprises at least one supplementary scrap-containing layer, (the scrap being obtained during manufacture of the said multi-layer foil structure), said supplementary layer being constituted by a mixture of said scrap with a sufficient amount of a graft co-polymer of a styrenic monomer on a polyolefinic substrate.

In the multi-layer foil structure according to the invention, the scrap-containing layer is extremely homogenous and presents, on the one hand, sufficiently good mechanical characteristics for avoiding delamination and, on the other hand, rheological and chemical properties such that it adheres satisfactorily to the polymer layers with which it is in direct contact.

In the mixture including the scrap of the multi-layer foil structure and said grafted copolymer, which mixture constitutes said supplementary layer, the weight ratio of graft copolymer to scrap is advantageously comprised between 0.2:1 and 9:1, and preferably between 0.3:1 and 2:1.

As already indicated herein-above, the grafted copolymer used according to the present invention is a graft copolymer of a styrenic monomer on a poly-olefinic substrate. The term "styrenic monomer," as used in the present description, designates a single styrenic monomer, such as styrene, methylstyrene or chlorostyrene, as well as a mixture of styrene with a minor amount (by weight) of methylstyrene or chlorostyrene, or else a mixture of one or more styrenic monomers with a minor amount (by weight) of an acrylic monomer and/or dienic monomer, such as a mixture of a styrenic monomer selected from the group comprising styrene, methylstyrene and chlorostyrene with a minor amount (by weight) of one or more monomers selected from the group comprising acrylonitrile, methacrylonitrile, alkyl acrylates and methacrylates, butadiene and isoprene. As regards the polyolefinic substrate, this substance is selected from the group of $C_2$ to $C_6$ alpha-olefinic homopolymers, especially polyethylene, polypropylene, polybutene, poly(4-methyl-pentene), the copolymers of the before-mentioned alpha-olefinic homopolymers, possibly in the presence of a diene, particularly amorphous ethylene/propylene or ethylene/butene-1 copolymers, amorphous ethylene/propylene/diene terpolymers, ethylenic copolymers containing less than 10% (by weight) of propylene or butene-1, and the propylene copolymers containing less than 10% (by weight) of ethylene or butene-1, as well as from the group comprising the copolymers of said alpha-olefins with a vinyl monomer, especially ethylene/vinyl alkanoate copolymers and ethylene/alkyl acrylate or ethylene/alkyl methacrylate copolymers. Graft copolymers which are particularly advantageous in accordance with the present invention are graft copolymers of styrene on a polyolefinic copolymer such as polyethylene, polypropylene, random ethylene/vinyl acetate copolymer; random ethylene/($C_1$ to $C_4$-alkyl) acrylate or ethylene/($C_1$ to $C_4$-alkyl) methacrylate copolymer especially random ethylene/ethyl acrylate copolymer and amorphous ethylene/propylene or ethylene/butene-1 copolymer, or also amorphous ethylene/propylene/diene terpolymer.

Advantageously the graft copolymer contains at least 10% by weight of grafted styrene monomer, preferably in an amount comprised between 15 and 50% and, more particularly, in an amount comprised between 20 to 40%.

The method of preparing the graft copolymer is not critical; indeed any known method of grafting a styrene monomer (or styrenic monomer) on a polyolefinic substrate may be used to this end. More particularly, it is possible to perform a radicalar grafting in aqueous suspension at a temperature which, depending on the circumstances, may be lower than, equal to, or higher than the melting point of the polyolefinic substrate. It is particularly advantageous to perform radicalar grafting in aqueous suspension at a temperature equal to or higher than the melting point of the polyolefinic substrate in accordance with the method described in French Patent Specification No. 1,588,502.

The styrene polymer layer of the multi-layer foil structure according to the invention is constituted by one or a plurality of polymers selected from the group comprising homopolymers of styrenic monomers, such as styrene, methyl-styrene, chlorostyrene, the copolymers formed by copolymerization of such monomers, especially styrene copolymers containing a minor amount (by weight) of methylstyrene or chlorostyrene, and copolymers containing one or more styrenic monomers and one or more acrylic and/or dienic monomers, particularly acrylonitrile, methacrylonitrile, alkyl acrylate or methacrylate, butadiene and isoprene, wherein the proportion of non-styrenic constituents is lower than 50% by weight. More particularly, these polymers may be selected from the group comprising polystyrene, polymethylstyrene, styrene/methylstyrene or styrene/chlorostyrene copolymers with a content of more than 50% by weight of styrene, polystyrenes modified by an elastomer, such as polybutadiene or polyisoprene, known under the name of "impact polystyrenes," styrene/acrylonitrile or styrene/methacrylonitrile copolymers containing more than 50% styrene, styrene/($C_1$ to $C_4$)-alkyl acrylate or styrene/($C_1$ to $C_4$ alkyl)-methacrylate copolymers, especially methyl methacrylate, containing more than 50% styrene, the preferred polymers being polystyrene and impact polystyrenes.

The olefinic polymer layer of the thermoplastic multi-layer foil structure according to the present invention is constituted by one or more polymers selected from the group comprising alpha-olefin (containing 2 to 6 carbon atoms)-homopolymers, copolymers of such alpha-olefins, copolymers formed by said alpha-olefins and vinyl monomers, especially vinyl alkanoates, more particularly alkyl acrylates or methacrylates, wherein the alpha-olefin content is at least equal to 50% by weight of the copolymer. Said olefinic polymers may be, in particular, polyethylene, polypropylene, polybutene-1, poly (4-methylpentene), propylene copolymers containing not more than 10% by weight of ethylene or butene-1, ethylene copolymers with at least 10% by weight of propylene or butene-1, ethylene/vinyl acetate copolymers containing at least 50% by weight of ethylene, ethylene/alkyl acrylate or ethylene/alkyl methacrylate copolymers the alkyl moeity of which contains 1 to 4 carbon atoms, especially ethyl acrylate or methyl methacrylate containing at least 50% by weight of ethylene, the preferred polymers being polyethylene, polypropylene, polybutene, propylene copolymers containing at least 10% ethylene or butene, and ethylene/vinyl-acetate or ethylene/ethyl acetate copolymers containing at least 50% by weight of ethylene.

In the multi-layer foil structure according to the invention, the styrenic polymer layer and the olefinic polymer layer are bonded by an intermediary polymer layer provided with a bonding layer, i.e. a layer constituted by a bonding agent. Said bonding layer may be constituted by a known polymer composition. Such polymer composition is constituted, for example, by a mixture of polymers selected from the group of polymers forming the styrenic polymer layer and the olefinic polymer layer of the structure, to which mixture may be added, if desired, additives such as atactic polypropylene, polyisobutylene having a low molecular weight, or styrene/butadiene/styrene block copolymers and amorphous ethylene/vinyl acetate copolymers, the proportions of the constituents of said compositions being so selected that these compositions exhibit the desired rheological and mechanical properties, especially satisfactory cohesion and extrusion properties, as well as a satisfactory compatibility with the polymers of the layers of the multi-layer foil structure with which said bonding polymer composition is in contact.

It is particularly advantageous that at least a small proportion of the constituents of the conventional bonding polymer composition used be substituted by a corresponding amount of a graft copolymer of a styrene monomer on a polyolefinic substrate such as described herein-above, which is also used, according to the invention, in admixture with the scrap obtained during the manufacture of the multi-layer foil structure; in certain cases the graft copolymer can even be used the single constituent of the bonding polymer composition.

In one embodiment of the invention the polymer bonding agent used in the manufacture of the multi-layer foil structure according to the invention contains 10% to 100% by weight of the above-mentioned graft copolymer. More particularly, said bonding agent may be constituted by a mixture of the graft copolymer with the aforementioned scrap, in a proportion of 0.1:1 to 9:1, preferably 0.3:1 to 2:1 of graft copolymer to scrap.

The thermoplastic multi-layer foil structure according to the invention may be produced in such a manner that the intermediary polymer layer bonding the styrenic polymer layer to the olefinic polymer layer is constituted by a single layer acting as a bonding layer and formed by a mixture of graft copolymer and multi-layer foil scrap, the scrap/graft copolymer weight ratio being advantageously comprised within the limits indicated herein-above.

According to another embodiment of the invention, the intermediary layer of polymer material bonding the styrenic polymer layer to the olefinic polymer layer is formed by the superimposition of a layer of bonding agent without scrap and a layer constituted by a mixture of graft polymer and scrap produced during the manufacturing of the multi-layer foil structure, said layer being in contact with the styrenic polymer layer, while the scrap-containing layer is in contact with the olefinic layer; the bonding layer may also be in contact with the olefinic polymer layer, while the scrap-containing layer is in contact with the styrenic polymer layer.

In another embodiment of the thermoplastic multi-layer foil structure according to the present invention, the intermediary polymer layer bonding the olefinic polymer layer to the styrenic polymer layer is constituted by a median layer formed of a mixture of the graft copolymer and scrap produced during the manufacturing of the multi-layer foil structure, two layers of a bonding agent without scrap being disposed respectively on the two faces of said median layer, one of said layers of bonding agent being in contact with the styrenic polymer layer whereas the other layer of bonding agent is in contact with the olefinic polymer layer.

In one particular embodiment, the intermediary polymer layer bonding the styrenic polymer layer to the olefinic polymer layer is simply constituted by a layer of bonding agent without scrap, while the styrenic polymer layer and/or the olefinic polymer layer is constituted by two basic layers of the corresponding styrenic or olefinic polymer, and a supplementary layer constituted by a mixture of the graft copolymer and the above-mentioned scrap is interposed between said two basic layers.

In these various embodiments the scrap-containing layer contains the graft copolymer and the scrap in proportions such that the graft copolymer/scrap ratio is comprised between 0.2:1 and 9:1 by weight, preferably 0.3:1 and 2:1 by weight.

Furthermore, in the embodiments using a bonding agent without scrap, said bonding agent may be constituted at least in part by a graft copolymer of the type of the graft copolymer used with an admixture of scrap. More particularly, the bonding agent without scrap may contain, by weight, 10 to 100% of said graft copolymer used with an admixture of scrap, said agent being advantageously constituted by the same graft copolymer as the one incorporated in the scrap.

As already pointed out herein-above, the thermoplastic multi-layer foil scrap is produced during the shaping or forming of articles, starting from the multi-layer foil structure, especially during the thermoforming operations which are carried out, in particular, with a view to producing rigid packing elements or elements for manufacturing furniture or sanitary installations.

The thermoplastic multi-layer structure according to the present invention can be prepared by any method allowing multi-layer polymer foil structures to be produced. Such multi-layer foil structure may be produced, for example, by co-extrusion or by the so-called "extrusion-lamination" process. It should be noted however that is is particularly advantageous to produce the multi-layer foil structure according to the invention by the co-extrusion process, especially when it is desired to submit such multi-layer foil structure to subsequent thermoforming operations, since it is then possible to recycle easily in a continuous manner the scrap obtained during thermoforming, after crushing said scrap and after adding thereto a convenient amount of graft copolymer, in the feed funnel(s) associated with the extruders, which feed the appropriate dies or nozzles of the co-extrusion device, i.e. the dies forming the scrap-containing layer.

The thermoplastic multi-layer foil structure according to the invention may have a thickness which is variable within wide limits, depending on the contemplated application. Thus, said multi-layer foil structure may be comparatively thin, e.g. in the order of several hundredths of microns to several tenths of millimeters, when it is to be used for the manufacture of rigid packing containers for food products. It is also possible to produce multi-layer foil structures having a thickness of about 1 to 10 millimeters with a view to manufacturing comparatively large thermoformed elements for furniture, sanitary installations, large-size packing containers, casing or housing for machines.

The invention will be described in a more detailed manner hereinbelow by means of several examples which are given by way of illustration but not of limitation. Unless specifically stated all parts or proportions are expressed by weight.

EXAMPLE 1

A graft copolymer comprising styrene grafted on a polyolefinic substrate constituted by a random ethylene/vinyl acetate copolymer (EVA copolymer) containing 14% by weight of vinyl acetate was prepared, the grafting reaction being performed by the radicalar method in aqueous suspension as described herein-after.

The following ingredients were introduced into a stainless steel autoclave provided with a stirrer turning at 160 rpm:
  water: 120 parts
  $Na_3PO_4$: 3 parts
  $Na_2CO_3$: 0.4 part
  $CaCl_2$: 1.8 parts
  $MgCl_2$: 0.5 part
  Na-dodecylbenzene sulfonate: 0.003 part
  EVA copolymer: 20 parts The autoclave was then closed and flushed with nitrogen, and its contents were heated to a temperature of 115° C. While maintaining this temperature and under continuous stirring, 9.4 liters styrene and 30 g tertiobutyl perbenzoate were introduced into the autoclave by means of a convenient injection pump, said introduction consisting at first of injections 4.5 liters styrene containing 15 g perbenzoate; then, after being left to stand a time, injecting a second fraction constituted by 4.5 liters styrene containing also 15 g perbenzoate, and finally injecting a third fraction constituted by 0.4 liter styrene.

The resulting reaction medium was maintained at a temperature of 115° C. during 5 hours.

The autoclave was then cooled and the copolymer separated from the reaction medium by filtration; the copolymer then washed, first with a diluted HCl solution and then—during a long period of time—with water; finally the copolymer was dried in an stove under vacuum.

The resulting product was a styrene copolymer grafted on an EVA copolymer, containing 20% by weight of grafted styrene and having a melt index of 0.8 (determined according to ASTM-D 1238-65T(E) standard).

Using the co-extrusion process, a thermoplastic multi-layer foil structure was prepared, which included a polystyrene layer and a low-density polyethylene layer bonded to each other by a bonding layer of a bonding agent which, in the present example, was constituted by a styrene/butadiene/styrene block copolymer. This multi-layer foil structure contained, by weight, 70% polystyrene, 20% low-density polyethylene and 10% bonding agent. Part of this multi-layer foil structure was transformed into scrap which was crushed and granulated.

A series of five (A, B, C, D, E) was performed with a view to determining the possibility of re-inserting the scrap into a multi-layer foil structure corresponding to the one from which the scrap has been produced, the re-insertion being carried out by incorporating the scrap in the intermediary layer bonding the polystyrene and the low density polyethylene layer (LDPE layer) to each other.

During test A, the crushed and granulated scrap was re-used without any additive substances for forming the intermediary or bonding layer provided for bonding the polystyrene and LDPE layers, the scrap-containing layer representing 10% of the total weight of the multi-layer foil structure.

In tests B and C, the crushed and granulated scrap was admixed to the graft copolymer of styrene on EVA, the composition of which is indicated hereinabove, and the resulting mixture was used for forming the intermediary layer adapted to bond the polystyrene and LDPE layers; the graft copolymer/scrap weight ratio was 0.5:1 in test B, and 1:1 in test C.

In tests D and E, the crushed and granulated scrap was admixed to a non-grafted EVA copolymer, and the resulting mixture was used for forming the intermediary (i.e. bonding) layer adapted to bond the polystyrene and LDPE layers; the non-grafted copolymer/scrap weight ratio was 1:1 in both tests, while the EVA copolymers used contained, respectively, 14% by weight vinyl acetate (test D) and 45% weight vinyl acetate (test E).

The ease of re-insertion of the scrap produced from a given multi-layer foil structure into said multi-layer structure largely depends on the homogeneity of the scrap-containing layer and the power of adhesion of said latter layer with respect to the polymers forming the layers with which said scrap-containing layer is to be in contact. The greater the homogeneity and the adhesive properties of the scrap-containing layer and the better the conditions of re-insertion of the scrap into the multi-layer foil structure. Thus, for each of tests A to E, the adhesive properties of the scrap-containing layer with respect to the polystyrene and the LDPE, as well as the homogeneity of said layers, are determined.

The homogeneity of the scrap-containing layer is determined by a demixing test which comprises examining a sample of said layer by means of an optical microscope under polarized light or by phase-contrast examination prior to, and after, heating the sample to a temperature of 200° C. during 24 hours. A satisfactory homogeneity is indicated by the absence of nodules of more than 5 microns in the sample submitted to examination (in this case no demixtion can be observed). On the contrary, when modules of more than 5 microns are present, this indicates demixing of the constituents of the sample under examination; thus, the higher the degree of demixing, the larger the size of the nodules.

One value, called "adhesive power," which represents the capacity of adhesion, is determined by a peeling-tensile test derives from the method defined in the ASTM-D-903 standard. With a view to performing the peeling-tensile test, a recording electronic dynamometer is used, which comprises an upper portion provided with claws and a lower displaceable portion which is also provided with claws. The said lower portion is moved downwardly at a speed of 20 millimeters per minute. The peeling force, expressed in gF, is recorded as a function of time; the recording is in the form of an ascending curve that is terminated by a level stretch. The value taken into consideration in this test is the recorded force with corresponds to said level stretch of the curve.

The sample is cut longitudinally from the multi-layer foil structure, in the form of a band or ribbon having a length of 10 cm and a width of 2 cm, and at one of the ends of said ribbon, a separation or delamination of the layers is caused by immersing said end of the ribbon in chloroform. Then the separated portions of said ribbon end of the sample are fixed by means of each one of the claws of the dynamometer, and the tensile test is carried out. Under these conditions, the angle formed between the two separated layers is equal to about 180° C.

When establishing the relation between the peeling force (given by the dynamometer) and the unit of width of the sample taken from the tested multi-layer foil structure, a value called "adhesive force" is obtained, which is expressed in gF per centimeter and which varies with the adhesiveness.

The results obtained by the various tests are listed in the following Table I.

TABLE I

| Test | Demixing test at 200° C. | Adhesion force on polystyrene (gF/cm) | Adhesion force on LDPE (g F/cm) |
|---|---|---|---|
| A | High demixing | 200 (delamination) | <100 |
| B | Very slight demixing | 400 | 400 |
| C | No demixing | 850 | 2200 |
| D | High demixing | 200 (delamination) | 250 |
| E | Demixing | 800 | <100 |

A study of the results listed in Table I leads to the following conclusions:

the scrap obtained from the multi-layer foil structure cannot be usefully re-inserted without the use of an additive as an intermediary layer interposed between the polystyrene layer and the LDPE layer (test A), due to the insufficient adhesiveness of this scrap-containing layer to the polystyrene layer, the insufficient adhesiveness to the LDPE layer, and also its heterogeneity (high demixing at 200° C.) which causes delamination during the co-extrusion with re-utilisation of the scrap;

the admixture to the scrap of a graft copolymer of a styrenic monomer on a polyolefinic substrate (in the present example a graft copolymer of styrene on an EVA copolymer) in accordance with the present invention (tests B and C) permits the production of a scrap-containing layer, which has a sufficient homogeneity (very low or no demixing at 200° C.) and a satisfactory adhesion force (Test B) or a very satisfactory adhesion force (Test C) with respect to the polystyrene and LDPE layers, whereby no delamination occurs during the process of co-extruding the materials to produce a multi-layer foil structure including said scrap;

the admixture to scrap of a known graft copolymer having satisfactory properties of adhesion to polystyrene and LDPE, especially on EVA copolymer, as indicated in tests D and E, does not allow the satisfactory re-insertion of the scrap, since the layer produced when using said scrap and EVA copolymer is not sufficiently homogeneous (demixing at 200° C.) and exhibits insufficient adhesion, on the one hand with respect to polystyrene, where delamination occurs (test D using an EVA copolymer having a low vinyl acetate content), and on the other hand with respect to LDPE (Test E using an EVA copolymer having a comparatively higher vinyl acetate content).

EXAMPLE 2

In accordance with the mode of operation described in Example 1, but replacing the EVA copolymer by a low-density polyethylene, a graft copolymer of styrene on a polyolefinic substrate consisting of a low-density polyethylene was prepared. The resulting graft copolymer contained 27% by weight of grafted styrene and had a melt index of 0.5 as determined according to ASTM-D 1268-65T (Method E) standard.

Operating according to the conditions described with reference to tests B and C of Example 1, but replacing the graft copolymer of styrene on an EVA copolymer by the same amount of weight of the above-mentioned graft copolymer of styrene on low-density polyethylene, two tests (F and G) were performed with a view to determining the possibility of re-inserting the multi-layer foil scrap as described in tests B and C, while admixing to said scrap the graft copolymer of styrene on low-density polyethylene.

The results obtained are listed in the following Table II.

TABLE II

| Test | Demixing test at 200° C. | Adhesion force on polystyrene(gF/cm) | Adhesion force on LDPE(gF/cm) |
|---|---|---|---|
| F | Very low demixing | 300 | 350 |
| G | Very low demixing | 500 | 1400 |

The admixture of graft copolymer of styrene on low-density polyethylene also allows production of a scrap-containing layer having an appropriate homogeneity (very low demixing at 200° C.) and a satisfactory adhesion force with respect to the polystyrene and LDPE layers, such scrap-containing layer causing no delamination during the process of co-extrusion of the multi-layer foil structure including such scrap-containing layer.

EXAMPLE 3

Using the co-extrusion process, a thermoplastic multi-layer foil structure was prepared, which comprised a polystyrene layer and a low-density polyethylene layer bonded by a bonding agent layer constituted only by the graft copolymer of styrene on EVA copolymer, the preparation of which is described in Example 1. This multilayer foil structure contained, by weight, 70% polystyrene, 20% polyethylene and 10% bonding agent. Part of said multi-layer foil structure was transformed into scrap which was crushed and granulated.

A test of re-insertion of the scrap into a multi-layer foil structure, corresponding to that from which said scrap was produced, has been performed, said scrap being incorporated in the form of a mixture with a graft copolymer of styrene on an EVA copolymer having the same composition as that of the graft copolymer used as a bonding agent, in a layer arranged between the bonding layer and the polystyrene layer, so as to form a four-layer foil structure comprising a LDPE layer, a bonding layer (graft copolymer alone), a layer constituted by scrap and graft copolymer and a layer of polystyrene. In the layer containing the scrap the graft copolymer/scrap weight ratio was equal 1:1. Furthermore, the thickness of the scrap-containing layer represented 30% of the total thickness of the thus formed four-layer foil structure, said total thickness being equal to the initial multi-layer foil structure from which the scrap was produced, i.e. the thickness of the multi-layer structure comprising three layers: polystyrene, bonding agent and LDPE.

The homogeneity properties of the scrap-containing layer and its adhesion force with respect to the polystyrene layer and to the bonding agent layer (constituted by the graft copolymer of styrene on an EVA copolymer)), as well as the adhesion force of the bonding agent with respect to the LDPE layer were determined by means of the methods described in Example 1, and the following results were obtained.

The scrap-containing layer (mixture of scrap and graft copolymer) did not exhibit any delamination phenomenon at 200° C. and its adhesion force, with respect to the polystyrene was equal to 800 gF/cm, while its adhesion force with respect to the bonding agent was equal to 1500 gF/cm; these results indicate a satisfactory homogeneity and a most satisfactory adhesiveness. Furthermore, no delamination was observed during the co-extrusion of the four-layer structure including the scrap-containing layer.

As regards the bonding agent which is constituted only by the graft copolymer, said agent has, when in contact with the LDPE layer, a total adhesion force, which shows that the adhesion force between the LDPE layer and the said bonding agent layer is higher than the cohesion force of the graft copolymer.

In this case, the advantageous effect of the graft copolymer incorporated in the scrap, while facilitating the re-insertion of the latter, is enhanced by the utilisation of a graft copolymer of the same nature for constituting the bonding agent adapted to bond the scrap-containing layer to the low-density polyethylene layer (LDPE layer).

The invention is not limited to the examples described hereinabove, which are given only by way of illustration, the scope of the invention being in fact defined by the appended claims.

What is claimed is:

1. A thermoplastic multi-layer foil structure comprising a thermoplastic styrenic polymer layer comprising at least one polymer selected from the group consisting of styrene, methyl styrene, chlorostyrene and mixtures thereof, copolymers containing at least 50% styrene, methyl styrene, chlorostyrene and mixtures thereof and acrylonitrile, methacrylonitrile, a $C_1$ to $C_4$ alkyl acrylate, a $C_1$ to $C_4$ alkyl methacrylate, butadiene, isoprene, and polymers of styrene, methylstyrene and chlorostyrene, and mixtures thereof modified with polybutadiene or polyisoprene, a thermoplastic olefinic polymer layer comprising at least one polymer selected from the group consisting of polymers of alpha olefins containing 2 to 6 carbon atoms and mixtures thereof, polymers containing at least 50% by weight of alpha olefins containing 2 to 6 carbon atoms with vinyl alkanoates, alkylacrylates, alkylmethacrylates and mixtures thereof, bonded by an intermediary polymer layer comprising at least one layer comprising a bonding agent, wherein at least one layer containing scrap produced from the multi-layer foil structure is included in the multi-layer foil structure intermediate of said styrenic and olefinic polymer layers, said scrap-containing layer comprising a mixture of said scrap with a graft copolymer in a ratio of graft copolymer to scrap of from 0.2:1 to 9:1 wherein the graft copolymer comprises at least one polyolefinic substrate selected from the group consisting of polymers of $C_2$ to $C_6$ alpha-olefin monomers and mixtures thereof, polymers of said alpha-olefin monomers and a diene, polymers of said alpha olefin monomers and vinyl monomers having grafted thereon from 10 to 50% by weight of a styrenic monomer selected from the group consisting of styrene, methyl styrene, chlorostyrene, and mixtures thereof, and mixtures of at least one of said monomers with a minor amount of at least one monomer selected from the group consisting of acrylonitrile, methacrylonitrile, alkylacrylates, alkylmethacrylates, butadiene, and isoprene.

2. A thermoplastic multi-layer foil structure of claim 1, wherein in the mixture of scrap and graft copolymer comprising said scrap-containing layer, the graft copolymer/scrap weight ratio is between 0.3:1 and 2:1.

3. A thermoplastic multi-layer foil structure of claim 1 or 2, wherein the polyolefinic substrate on which the styrenic monomer is grafted is selected from the group consisting of polyethylene, polypropylene, polybutene, poly(4-methyl-pentene), amorphous ethylene/propylene copolymers, amorphous ethylene/butene-1 copolymers, amorphous ethylene/propylene/diene terpolymers, ethylene/propylene copolymers, containing less than about 10% by weight of propylene, ethylene/butene-1 copolymers with less than about 10% by weight of butene-1, propylene/ethylene copolymers containing less than about 10% by weight of ethylene, propylene/butene-1 copolymers containing less than about 10% by weight of butene-1, ethylene/vinyl alkanoate copolymers, ethylene/alkylacrylate copolymers, and ethylene/alkylmethacrylate copolymers.

4. A thermoplastic multi-layer foil structure according to claim 1 or 2, wherein said graft copolymer is a graft copolymer of styrene on a polyolefinic substrate, such as polyethylene, randon ethylene/vinyl acetate copolymer, random ethylene($C_1$ to $C_4$)-alkyl acrylate copolymer, random ethylene/($C_1$ to $C_4$)-alkyl methacrylate copolymer, amorphous ethylene/propylene copolymer, amorphous/ethylene/butene-1 copolymer and amorphous ethylene/propylene/diene terpolymer.

5. A thermoplastic multi-layer foil structure according to claim 1, wherein said graft copolymer comprises, 20 to 40% by weight of said grafted styrenic monomer.

6. A thermoplastic multi-layer foil structure of claim 1 or 2, wherein said styrenic polymer layer comprises at least one polymer selected from the group consisting of polystyrene, polymethylstyrene, styrene/methylstyrene containing more than 50% by weight of styrene, styrene/chlorostyrene copolymers containing more than 50% by weight of styrene, polystyrene modified by polybutadiene, polystyrene modified by polyisoprene, styrene acrylonitrile copolymers containing more than 50% by weight of styrene, styrene/methacrylonitrile copolymers containing more than 50% styrene, styrene/($C_1$ to $C_4$) alkylacrylate copolymers containing more than 50% by weight styrene and styrene/($C_1$ to $C_4$)-alkylmethacrylate copolymers containing more than 50% by weight of styrene.

7. A thermoplastic multi-layer foil structure of claim 1 or 2, wherein the layer of olefinic polymer comprises at least one polymer selected from the group consisting of polyethylene, polypropylene, polybutene-1, poly(4-methyl pentene), propylene copolymers containing not more than 10% by weight of ethylene or butene-1, ethylene copolymers containing not more than 10% by weight of propylene or butene-1, ethylene/vinyl acetate copolymers containing at least 50% by weight of ethylene, ethylene/($C_1$ to $C_4$)-alkylacrylate containing at least 50% by weight of ethylene and ethylene/($C_1$ to $C_4$)-alkylmethacrylate copolymers containing at least 50% by weight of ethylene.

8. A thermoplastic multi-layer foil structure according to claim 1 or 2, wherein the bonding layer provided in the intermediary polymer layer, which bonds said styrenic polymer and olefinic polymer layers, comprises a bonding agent containing 10 to 100%, by weight of said bonding agent, of a graft copolymer scrap, for forming the scrap-containing layer.

9. A thermoplastic multi-layer foil structure according to claim 1, wherein the intermediary layer bonding said styrenic polymer and said olefinic polymer layers comprises a mixture of a graft copolymer and multi-layer foil scrap, the graft polymer/scrap weight ratio of said mixture being between 0.2:1 and 9:1.

10. A thermoplastic multi-layer foil structure according to claim 1, wherein the intermediary polymer layer bonding the styrenic polymer layer and olefinic polymer layer comprises a layer of a bonding agent without scrap superimposed on a layer including a mixture of said graft copolymer with said scrap, said layer of bonding agent being in contact with the olefinic polymer layer, while the scrap-containing layer is in contact with the styrenic polymer layer.

11. A thermoplastic multi-layer foil structure according to claim 1, wherein the intermediary polymer layer bonding the olefinic polymer layer and styrenic polymer layer comprises a median layer comprising a mixture of said graft copolymer with said scrap, a layer of bonding agent without scrap is provided on each face of said intermediary layer, one of said bonding agent layers being in contact with the styrenic polymer layer, while the other bonding agent layer is in contact with said olefinic polymer layer.

12. A thermoplastic multi-layer foil structure according to claim 1, wherein said intermediary layer bonding said styrenic polymer and olefinic polymer layers comprises a bonding agent without scrap, while the styrenic polymer layer or the olefinic layer comprises two basic layers of a corresponding styrenic or olefinic polymer, between which two basic layers is provided a layer including a mixture of said graft copolymer with said scrap.

13. A thermoplastic multi-layer foil structure of claim 10 or 11, or 12, wherein said bonding agent without scrap contains 10 to 100% by weight of the graft copolymer used in admixture with said scrap.

14. A thermoplastic multi-layer foil structure of claim 1 or 2, produced by co-extrusion or by an extrusion-lamination process.

15. A thermoplastic multi-layer foil structure of claim 1 or 2, said multi-layer structure being produced by co-extrusion and then submitted to at least one thermoforming operation whereby at least one thermoformed article is produced, wherein at least one portion of the scrap obtained during the thermoforming operation being recycled after being crushed and granulated, said scrap being added to said graft copolymer in the feed funnel of the extruder which feeds the extrusion die of the co-extrusion device provided for producing the scrap-containing layer.

16. An article shaped from a thermoplastic multi-layer foil structure of claim 1.

17. A thermoplastic multi-layer foil structure according to claim 10, wherein the intermediary layer bonding said styrenic polymer and said olefinic polymer layers comprises a mixture of graft copolymer and multi-layer foil scrap in a graft polymer/scrap weight ratio between 0.3:1 and 2:1.

18. A thermoplastic multi-layer foil structure according to claim 1, wherein the intermediary polymer layer bonding the styrenic polymer and olefinic polymer layers comprises a layer of bonding agent without scrap superimposed on a layer including a mixture of said graft copolymer with said scrap, said layer of bonding agent being in contact with the styrenic polymer layer while said scrap-containing layer is in contact with said olefinic polymer layer.

* * * * *

UNITED STATES PATENT AND TRADEMARK OFFICE
CERTIFICATE OF CORRECTION

PATENT NO. : 4,234,663                          Page 1 of 2
DATED : Nov. 18, 1980
INVENTOR(S) : Raymond Catté, et al It is certified that error appears in the above—identified patent and that said Letters Patent is hereby corrected as shown below:

In the title page, the name of the last inventor should read: --Jean-Pierre Salaün--.

Column 2, lines 11-12: After "thermoforming" insert --of--.

Column 4, line 29: "moeity" should read --moiety--.

line 67: After "used" insert --as--.

Column 6, line 11: "is" (1st occurrence) should read --it--.

Column 7, line 9: "an" should read --a--.

line 27: After "five" insert --tests--.

Column 8, line 10: "modules" should read --nodules--.

line 16: "derives" should read --derived--.

Column 9, line 19: "on" should read --an--.

Column 11, line 7: "of styrene" should read --of polymers of styrene--.

line 65: "randon" should read --random--.

Column 12, line 1: "amorphous/ethylene" should read --amorphous ethylene--.

line 14: "styrene acrylonitrile copolymers" should read --styrene/acrylonitrile copolymers--.

UNITED STATES PATENT AND TRADEMARK OFFICE
CERTIFICATE OF CORRECTION

PATENT NO. : 4,234,663

DATED : Nov. 18, 1980

INVENTOR(S) : Raymond Catte, et al

It is certified that error appears in the above—identified patent and that said Letters Patent is hereby corrected as shown below:

Column 12, line 39: "of a graft copolymer scrap" should read --of the graft copolymer used--.

Column 14, line 7: Change "claim 10" to --claim 9--.

Signed and Sealed this

Fourth Day of August 1981

[SEAL]

Attest:

Attesting Officer

GERALD J. MOSSINGHOFF

Commissioner of Patents and Trademarks